(12) United States Patent
Stephenson et al.

(10) Patent No.: US 11,552,785 B2
(45) Date of Patent: Jan. 10, 2023

(54) METHODS AND SYSTEMS FOR A SYNCHRONIZED DISTRIBUTED DATA STRUCTURE FOR FEDERATED MACHINE LEARNING

(71) Applicant: Epidaurus Health, Inc., Wilmington, DE (US)

(72) Inventors: Mark Stephenson, Washington, DC (US); Daina Andries, Washington, DC (US); Christopher Michio Aida, Washington, DC (US)

(73) Assignee: Epidaurus Health, Inc., Wilmington, DE (US)

( * ) Notice: Subject to any disclaimer, the term of this patent is extended or adjusted under 35 U.S.C. 154(b) by 0 days.

(21) Appl. No.: 17/220,452

(22) Filed: Apr. 1, 2021

(65) Prior Publication Data
US 2021/0314140 A1 Oct. 7, 2021

Related U.S. Application Data

(60) Provisional application No. 63/004,049, filed on Apr. 2, 2020.

(51) Int. Cl.
*H04L 9/06* (2006.01)
*G06N 20/00* (2019.01)
(Continued)

(52) U.S. Cl.
CPC ............ *H04L 9/0643* (2013.01); *G06F 16/27* (2019.01); *G06N 20/00* (2019.01); *H04L 9/3066* (2013.01);
(Continued)

(58) Field of Classification Search
CPC ... H04L 9/0643; H04L 9/3218; H04L 9/3066; H04L 9/008; H04L 2209/38; H04L 9/3221; G06F 16/27; G06N 20/00
See application file for complete search history.

(56) References Cited

U.S. PATENT DOCUMENTS 9,082,119 B2 7/2015 Ortiz et al.
9,792,742 B2 10/2017 Johnson et al.
(Continued)

OTHER PUBLICATIONS

"Thesmar et al., Combining the Power of Artificial Intelligence with the Richness of Healthcare Claims Data: Opportunities and Challenges, Mar. 2019, PharmacoEconomics, pp. 745-752" (Year: 2019).*
(Continued)

*Primary Examiner* — Saleh Najjar
*Assistant Examiner* — Nhan Huu Nguyen
(74) *Attorney, Agent, or Firm* — Caldwell Intellectual Property Law

(57) ABSTRACT

A system for an artificial intelligence synchronized distributed ledger. The system includes a computing device containing a receiving module, the receiving module designed and configured to receive an input from a remote device, parse the input to identify protected and non-protected data contained within the input, transform the protected data into a digitally signed assertion and convert the non-protected into an encrypted datastore. The computing device containing a processing module, the processing module designed and configured to receive the digitally signed assertion from the receiving module, insert the digitally signed assertion into an immutable sequential data structure, receive the encrypted datastore, retrieve at least an input, generate a record utilizing the at least a retrieved input, and perform a first machine-learning process utilizing the at least a retrieved input.

18 Claims, 9 Drawing Sheets

(51) Int. Cl.
*G06F 16/27* (2019.01)
*H04L 9/30* (2006.01)
*H04L 9/32* (2006.01)
*H04L 9/00* (2022.01)

(52) U.S. Cl.
CPC .......... *H04L 9/3218* (2013.01); *H04L 9/008* (2013.01); *H04L 9/3221* (2013.01); *H04L 9/50* (2022.05)

(56) References Cited

U.S. PATENT DOCUMENTS

| | | | |
|---|---|---|---|
| 9,892,460 | B1 | 2/2018 | Winklevoss et al. |
| 10,026,118 | B2 | 7/2018 | Castinado et al. |
| 10,231,077 | B2* | 3/2019 | Raduchel ............... G16H 10/60 |
| 10,541,807 | B1* | 1/2020 | Morimura ............... G16H 15/00 |
| 10,593,425 | B1* | 3/2020 | Truscott ............... G16H 40/20 |
| 10,621,164 | B1* | 4/2020 | Kain ...................... G06F 16/244 |
| 10,621,510 | B2* | 4/2020 | Saxena .................. G06N 20/00 |
| 10,720,241 | B2* | 7/2020 | Knowlton ............... G16H 50/30 |
| 10,733,566 | B1* | 8/2020 | Chan ...................... G16H 40/20 |
| 10,755,812 | B1* | 8/2020 | Cai ......................... G16H 40/20 |
| 2016/0012424 | A1 | 1/2016 | Simon et al. |
| 2016/0048648 | A1* | 2/2016 | Sanchez ................. G16H 50/20 706/12 |
| 2016/0300234 | A1 | 10/2016 | Moss-Pultz et al. |
| 2017/0017936 | A1 | 1/2017 | Basikalo et al. |
| 2017/0161439 | A1* | 6/2017 | Raduchel ............... H04W 12/06 |
| 2017/0220554 | A1* | 8/2017 | Carter ................... G06F 40/284 |
| 2017/0228368 | A1* | 8/2017 | Carter ................... G06F 40/284 |
| 2017/0243286 | A1* | 8/2017 | Castinado ............... H04L 63/08 |
| 2017/0286717 | A1* | 10/2017 | Khi ........................ H04W 12/10 |
| 2018/0082024 | A1* | 3/2018 | Curbera ............... H04L 9/0637 |
| 2018/0129955 | A1* | 5/2018 | Saxena ............... G06F 21/6245 |
| 2018/0165416 | A1* | 6/2018 | Saxena ............... G06F 21/6245 |
| 2018/0211058 | A1* | 7/2018 | Aunger ............... H04L 63/0428 |
| 2018/0218779 | A1* | 8/2018 | Collins, Jr. ............ G16H 10/60 |
| 2018/0232739 | A1 | 8/2018 | Battle |
| 2018/0253682 | A1* | 9/2018 | Gilman ................. G06Q 20/28 |
| 2019/0198144 | A1* | 6/2019 | Blackley ................ G06F 16/27 |
| 2019/0214134 | A1* | 7/2019 | Bates ..................... G16H 10/60 |
| 2019/0354693 | A1* | 11/2019 | Yoon ................... G06F 21/6245 |
| 2019/0355450 | A1* | 11/2019 | Altstadter ............. G16H 20/17 |
| 2020/0005919 | A1* | 1/2020 | Hill, Sr. ................ G16H 10/60 |
| 2020/0111578 | A1* | 4/2020 | Koblick ................ G16H 20/10 |
| 2020/0143278 | A1* | 5/2020 | Narain ................. G16H 50/50 |
| 2020/0250562 | A1* | 8/2020 | Bly ........................ G06N 5/022 |
| 2020/0294642 | A1* | 9/2020 | Bostic ................... G16H 20/10 |
| 2020/0327250 | A1* | 10/2020 | Wang .................... G16B 50/20 |
| 2020/0351310 | A1* | 11/2020 | Leighton ............... H04L 9/3234 |
| 2020/0357515 | A1* | 11/2020 | Chen ...................... G06N 7/005 |
| 2020/0410614 | A1* | 12/2020 | Bonageri ............... G06N 20/20 |
| 2020/0411146 | A1* | 12/2020 | McEwing .............. G16H 50/70 |
| 2021/0005296 | A1* | 1/2021 | McFarlane ......... G06Q 20/3827 |
| 2021/0044440 | A1* | 2/2021 | Filali ..................... H04L 9/3247 |
| 2021/0075623 | A1* | 3/2021 | Petersen ............... H04L 9/0618 |
| 2021/0142353 | A1* | 5/2021 | Jogani ................... G06N 20/10 |

OTHER PUBLICATIONS

Guy, et al., Decentralizing privacy: Using blockchain to protect personal data, journal, 2015 IEEE CS Security and Privacy Workshops Retrieved from http://homepage.divms.uiowa.edu/~ghosh/blockchain.pdf.

Hajialikhani et al., UniqueID: Decentralized Proof-of-Unique-Human, journal, Jun. 20, 2018 Retrieved from htttps://arxiv.org/pdf/1806.07583.pdf.

Gemalto & R3, Gemalto and R3 pilot blockchain technology to put users in control of their Digital ID, Sep. 18, 2018 Retrieved from Proquest.

Benli et al., BioWallet: A Biometric Digital Wallet, journal, ICONS 2017 : The Twelfth International Conference on Systems, Dec. 31, 2017 Retrieved from https://www.thinkmind.org/download.php?articleid=icons_2017_3_10_40006.

Eskandari et al., A first look at the usability of bitcoin key management, journal, Feb. 12, 2018 Retrieved from https://arxiv.org/pdf/1802.04351.pdf.

* cited by examiner

METHODS AND SYSTEMS FOR A SYNCHRONIZED DISTRIBUTED DATA STRUCTURE FOR FEDERATED MACHINE LEARNING

CROSS-REFERENCE TO RELATED APPLICATIONS

This application claims the benefit of priority of U.S. Provisional Patent Application Ser. No. 63/004,049, filed on Apr. 2, 2020, and titled "METHODS AND SYSTEMS FOR AN ARTIFICIAL INTELLIGENCE SYNCHRONIZED DISTRIBUTED LEDGER," which is incorporated by reference herein in its entirety.

FIELD OF THE INVENTION

The present invention generally relates to the field of artificial intelligence. In particular, the present invention is directed to methods and systems for an artificial intelligence synchronized distributed ledger.

BACKGROUND

Accurate synchronization of immutable sequential data structures can be challenging. Often time, it can be difficult to implement systems that are updated and correct. There remains to be seen, the ability for portable and updated immutable sequential data structure allowing access for a multitude of purposes.

SUMMARY OF THE DISCLOSURE

In an aspect, a system for a synchronized distributed data structure for federated machine learning includes a computing device, the computing device configured to receive an input from a remote device, parse the input to identify protected and non-protected data contained within the input, transform the non-protected data into an encrypted proof-linked assertion, convert the protected data into an encrypted datastore, insert the encrypted proof-linked assertion into a hashed field of an immutable sequential data structure, retrieve the input from at least one of the immutable sequential data structure and the encrypted data, generate a record as a function of the input, and perform a first machine-learning process as a function of the input.

A method of implementing a synchronized distributed data structure for federated machine learning includes receiving, by a computing device, an input from a remote device, parsing, by the computing device, the input to identify protected and non-protected data contained within the input, generating, by the computing device, an encrypted proof-linked assertion using the non-protected data, encrypting, by the computing device, the protected data, inserting, by the computing device, the encrypted proof-linked assertion into a hashed field of an immutable sequential data structure, retrieving, by the computing device, the input from at least one of the immutable sequential data structure and the encrypted data, generating, by the computing device, a record as a function of the input, and performing, by the computing device, a first machine-learning process as a function of the input.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
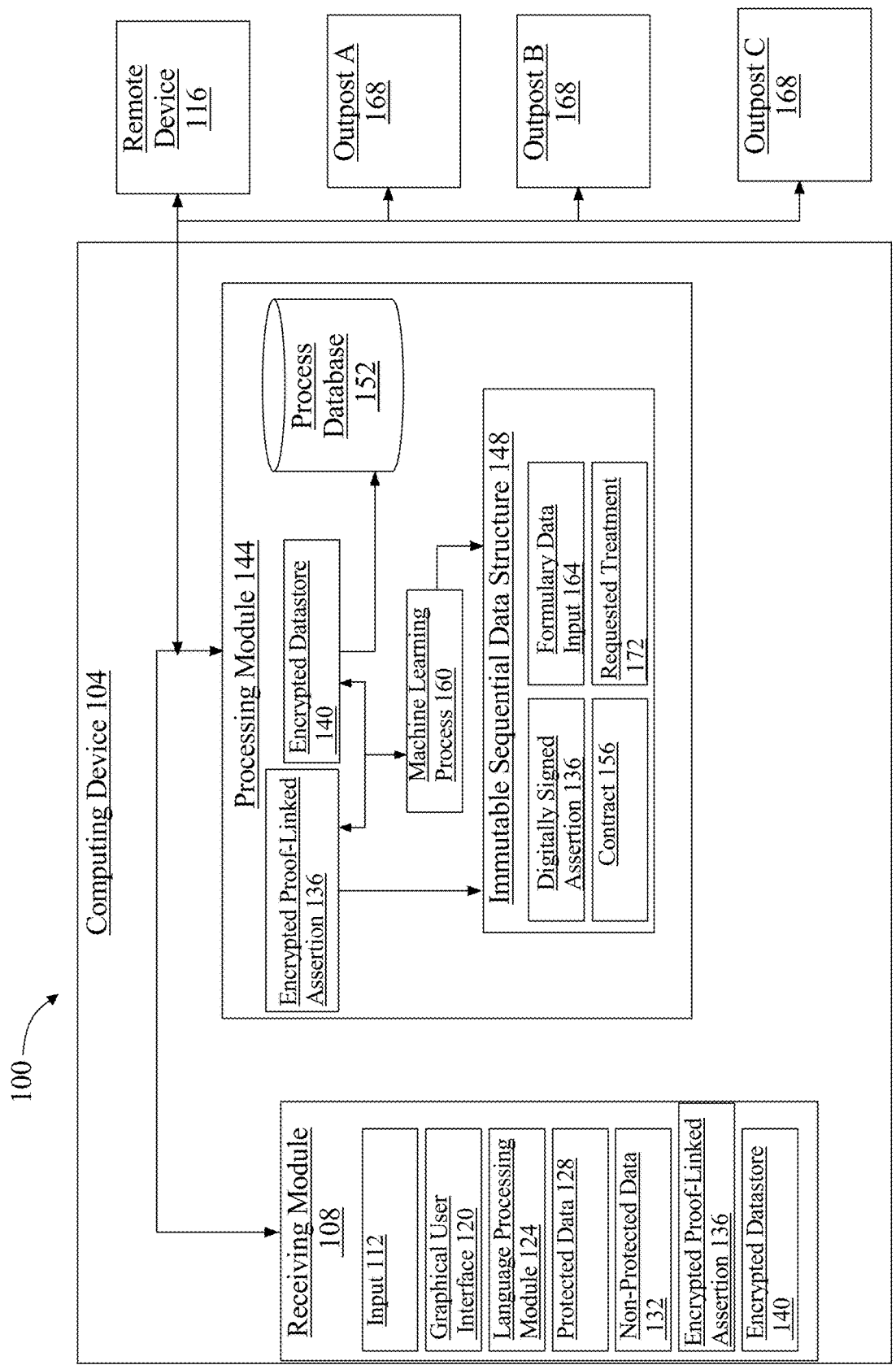
FIG. 1 is a block diagram illustrating an exemplary embodiment of a system for an artificial intelligence synchronized distributed ledger.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments described in this disclosure provide a means for secure storage and updating of information secured using cryptographic methods such as elliptic curve cryptography and hash chains. Information contained within one or more records may be utilized in combination with machine-learning algorithms, which may include federated machine-learning algorithms. Use of one-way cryptographic functions to ensure immutability and secure and/or zero-knowledge proofs to ensure authenticity may guarantee computational infeasibility of exploits.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Systems and methods described in this disclosure may generate, manipulate, evaluate, or otherwise use digital signatures. A "digital signature," as used herein, is a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

Figure 2:
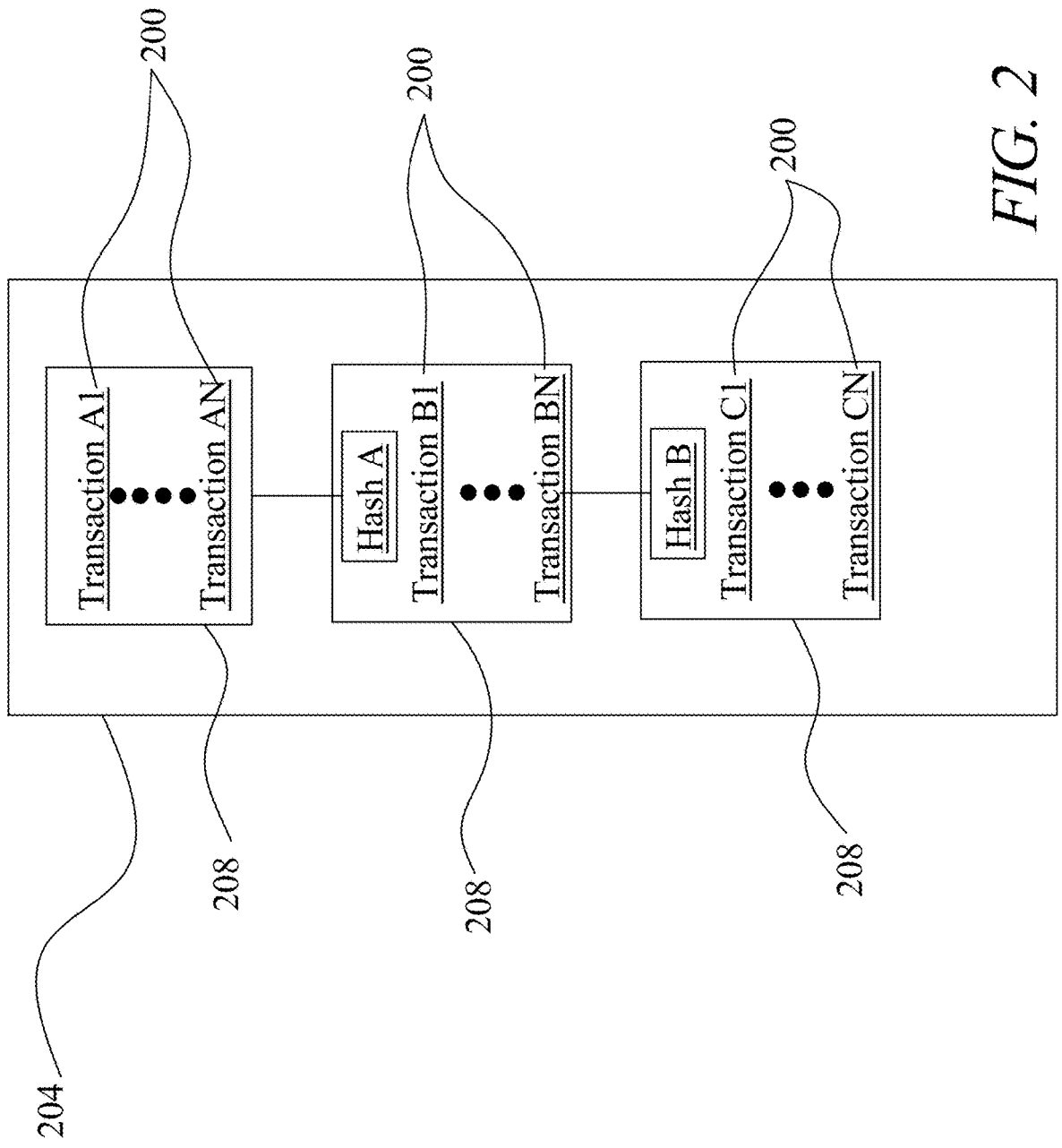
FIG. 2 is a block diagram illustrating an exemplary embodiment of an immutable sequential data structure of digitally signed assertions.

With continued reference to FIG. 2, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of a system 100 for an artificial intelligence synchronized distributed ledger is illustrated. System 100 includes a computing device. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices 104 in a first location and a second computing device 104 or cluster of computing devices 104 in a second location. Computing device 104 may include one or more computing devices 104 dedicated to data storage, security, distribution of traffic for load balancing, and the like. Computing device 104 may distribute one or more computing tasks as described below across a plurality of computing devices 104 of computing device 104, which may operate in parallel, in series, redundantly, or in any other manner used for distribution of tasks or memory between computing devices 104. Computing device 104 may be implemented using a "shared nothing" architecture in which data is cached at the worker, in an embodiment, this may enable scalability of system 100 and/or computing device 104.

Continuing to refer to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating input 112 and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a receiving module 108, which may be implemented in any manner suitable for implementation of any computing device, module, and/or component of computing device 104 as described above. Modules and/or components described as included in receiving module 108 are presented for exemplary purposes only; functions and/or structure pertaining to each such module and/or component may be implemented in any alternative or additional manner in computing device 104 and/or any component, module, and/or device incorporated in or communicatively connected to computing device 104, in any manner that may occur to persons skilled in the art, upon reviewing the entirety of this disclosure. A receiving module 108 and/or computing device 104 may be designed and configured to receive an input 112 from a remote device. An "input," as used in this disclosure, is data including any numerical, character, and/or symbolic data entered into system 100 pertaining to a user's health records. Health records may include information pertaining to medical, pharmacy, insurance, benefits, and the like. An input 112 may be generated by a user and may contain one or more elements of self-reported health information, such as demographic information, information pertaining to a user's medical records such as current medications a user takes. An input 112 may be generated by a third-party that contains information pertaining to a user. An input 112 may be generated by a pharmacist and may contain information pertaining to any prescription, which may be referred to alternatively herein as a "biochemical identification," that a user did or did not fill at a pharmacy. An input 112 may be generated by a provider and may contain information pertaining to any medical visit and/or medical consultation that a user had with a provider such as a doctor, physician assistant, nurse practitioner, and/or any health care provider. An input 112 may be generated by an employer of the user. An employer may include may person and/or institution that hires employees. An employer may provide benefits to an employee such as health, medical, dental, vision, and/or any other form of benefits to a user. In an embodiment, an employer may include a self-insured employer. A self-insured employer may include any employer that assumes the financial risk for providing health care benefits to its employees. A self-insured employer may operate their own health and/or drug plan. In an embodiment, an employer may include a fully insured employer. A fully insured employer may include any employer that pays a premium to an insurance carrier and the insurance carrier operates a health and/or drug plan.

With continued reference to FIG. 1, receiving module 108 and/or computing device 104 may receive an input 112 from a remote device 116. A remote device 116 may include without limitation, a display in communication with computing device 104, where a display may include any display as described herein. Remote device 116 may include an additional computing device, such as a mobile device, laptop, desktop, computer and the like. Receiving module 108 may receive an input 112 from a remote device 116 utilizing any network methodology as described herein. Receiving module 108 may receive an input 112 from an entry on a graphical user interface 120 located on a computing device. Graphical user interface 120 may include without limitation a form or other graphical element having data entry fields, where one or more input 112 may be entered. Fields my include free-form entry fields such as text-entry fields where an input 112 may be able to type or otherwise enter text, enabling a user to generate an input 112. Graphical user interface 120 may include for instance "drop-down" lists where a user may select one or mor entries pertaining to an input 112. Drop-down lists may include one or more pre-populated data entry fields where a user may be able to select one or more input 112 from a list.

With continued reference to FIG. 1, receiving module 108 and/or computing device is configured to parse an input 112 to identify protected data and non-protected data contained within an input 112. Receiving module 108 may include a language processing module 124 that may include any hardware and/or software module. Language processing module 124 may be configured to parse an input 112 to extract one or more words from an input 112. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols. Textual data may be parsed into segments, which may include a simple word (sequence of letters separated by whitespace) or more generally a sequence of characters as described previously. The term segments as used herein refers to any smaller, individual groupings of text from a larger source of text; segments may be broken up by word, pair of words, sentence, or other delimitation. These segments may in turn be parsed in various ways. Textual data may be parsed into words or sequences of words, which may be considered words as well. Textual data may be parsed into "n-grams", where all sequences of n consecutive characters are considered. Any or all possible sequences of segments or words may be stored as "chains", for example for use as a Markov chain or Hidden Markov Model.

With further reference to FIG. 1, a language processing model may include a program automatically generated by a computing device to produce associations between one or more terms extracted from a corpus of documents and detect associations, including without limitation mathematical associations, between such terms. Associations between language elements, where language elements include for purposes herein extracted terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given document is or is not indicating a category semantic relationship. Whether a phrase, sentence, word, or other textual element in a corpus of documents constitutes a positive or negative indicator may be determined, in an embodiment, by mathematical associations between detected significant terms, comparisons to phrases and/or words indicating positive and/or negative indicators that are stored in memory at computing device, or the like.

Still referring to FIG. 1, a computing device may generate a language processing model by any suitable method, including without limitation a natural language processing classification algorithm; language processing model may include a natural language process classification model, for instance as generated by training neural network, that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between semantic elements such as terms, phrases, tokens, etc. There may be a finite number of categories to which an extracted word may pertain; an HMI inference algorithm, such as the forward-backward algorithm or the Viterbi algorithm, may be used to estimate the most likely discrete state given a word or sequence of words. Computing device 104 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, receiving module 108, computing device 104, and/or language processing module 124 may identify protected data 128 and non-protected data 132 contained within an input 112. "z data," as used in this disclosure, includes any personal identification information relating to a user. Personal identification information may include information such as a user's name, date of birth, social security number, driver's license number, bank account number, passport number, email address and the like. "Non-protected data," as used in this disclosure, includes any clinical observation information pertaining to a user. Clinical observation information may include information such as medical conditions a user has been diagnosed with, medications that a user takes, previous medications that a user filled at a pharmacy and the like. Receiving module 108 and/or language processing module 124 is configured to identify personal information contained within an input 112 as protected data 128 and identify clinical observation data contained within an input 112 as non-protected data 132. For instance and without limitation, an input 112 that identifies a user's name, address, and current prescription medication as lisinopril 40 mg once daily may be parsed to identify the user's name and address as personal identification information wherein the personal identification information will be considered protected data 128, and the user's prescription medication of 40 mg of lisinopril once daily will be considered clinical observation data and as such considered non-protected data 132.

With continued reference to FIG. 1, receiving module 108 and/or computing device is configured to transform protected data 128 into an encrypted proof-linked assertion 136, which may include any digitally signed assertion. A "digitally signed assertion," as used in this disclosure, is a collection of textual data signed using a digital signature as described above. Digitally signed assertions may be used in and/or with immutable sequential data structures as described in further detail below.

With continued reference to FIG. 1, receiving module 108 and/or computing device 104 is configured to convert non-protected data 132 into an encrypted datastore 140. An "encrypted datastore," as used in this disclosure, is any data that is encoded and stored in a way that only authorized parties can access it and unauthorized parties cannot access it. An encrypted datastore 140 may be generated by taking a plaintext input 112 containing non-protected data 132 and using an encryption algorithm to generate ciphertext that can be read only if decrypted. An encryption algorithm may include using a pseudo-random encryption key generated by an algorithm. An encryption algorithm may include calculating one or more encryption schemes, including a symmetric key scheme, and/or a public-key encryption scheme. An encryption algorithm may include one or more hashing algorithms.

With continued reference to FIG. 1, system 100 may include a processing module 144, which may be implemented in any manner suitable for implementation of any computing device, module, and/or component of computing device 104 as described above. Modules and/or components described as included in processing module 144 are presented for exemplary purposes only; functions and/or structure pertaining to each such module and/or component may be implemented in any alternative or additional manner in computing device 104 and/or any component, module, and/or device incorporated in or communicatively connected to computing device 104, in any manner that may occur to persons skilled in the art, upon reviewing the entirety of this disclosure. Processing module 144 and/or computing device is designed and configured to receive an encrypted proof-linked assertion 136 from the receiving module. Processing module 144 and/or computing device may receive an encrypted proof-linked assertion 136 from the receiving module 108 utilizing any network methodology as described herein. Processing module 144 and/or computing device is designed and configured to insert an encrypted proof-linked assertion 136 into an immutable sequential data structure 148 and/or a hashed field thereof. A "immutable sequential data structure," as used in this disclosure, is a data structure that places data entries in a fixed sequential arrangement, such as a temporal sequence of entries and/or blocks, also referred to as "hashed fields," thereof, where the sequential arrangement, once established, cannot be altered or reordered. An immutable sequential data structure 148 may be, include and/or implement an immutable ledger, where data entries that have been posted to the immutable sequential data structure cannot be altered. An immutable sequential data structure may be utilized to record any set of data generated by elements or computing devices of system 100 in an inalterable format that permits authentication of such entry and may serve as a form of memory storage as described in further detail below. Immutable sequential data structure may be accessible at any of various security settings; for instance, and without limitation, the immutable sequential data structure may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. Immutable sequential data structure may, for instance be encrypted, and decryption keys may be distributed only to devices authorized to participate in authentication as described herein. In an embodiment, decryption key may be stored by transaction authentication nodes as described in further detail below. Exemplary embodiments of immutable sequential data structure, which may include embodiments of immutable sequential data structure, are described in more detail below in FIG. 2.

Continuing to look at FIG. 1 immutable sequential data structure may be implemented by a plurality of transaction authentication nodes. In an embodiment, a plurality of transaction authentication nodes implementing immutable sequential data structure may allow for multiple asset transfers to occur simultaneously. In an embodiment, an asset transfer at a first transaction authentication node may occur while at the same time a second asset transfer may occur at a second transaction authentication node. In an embodiment, a plurality of transaction authentication nodes provides additional levels of security by having additional verifications of accounts. In an embodiment, having a plurality of transaction authentication nodes implementing immutable sequential data structure may also allow for simultaneous updates from an institution and allow an institution to generate an approval for more than one transaction authentication node.

With continued reference to FIG. 1, processing module 144 and/or computing device is configured to receive an encrypted datastore 140 from receiving module. Processing module 144 and/or computing device may receive an encrypted datastore 140 utilizing any network methodology as described herein. Processing module 144 and/or computing device is configured to store an encrypted datastore 140. In an embodiment, processing module 144 may store an encrypted datastore 140 in a process database 152. A process database 152 may include any data structure for ordered storage and retrieval of data, which may be implemented as a hardware or software module. A process database 152 may be implemented, without limitation, as a relational database, a key-value retrieval datastore such as a NOSQL database, or any other format or structure for use as a datastore that a person skilled in the art would recognize as suitable upon review of the entirety of this disclosure.

With continued reference to FIG. 1, processing module 144 and/or computing device is configured to retrieve at least an input 112. Processing module and/or computing device may retrieve at least an input 112 utilizing one or more remarks from a remote device 116. For instance and without limitation, processing module 144 and/or computing device may receive a remark from a remote device 116 containing a request to retrieve a user's pharmacy records over a six-month period to determine what medications a user filled during the course of six-month period. In yet another non-limiting example, processing module 144 and/or computing device may receive a remark from a remote device 116 containing a request to retrieve a user's medical records, including what medical conditions a user was previously diagnosed with. Processing module 144 and/or computing device may retrieve at least an input 112 including an input 112 that may be stored as an encrypted proof-linked assertion 136, and/or at least an input 112 stored as an encrypted datastore 140. Processing module 144 and/or computing device may utilize language processing module 124 to determine what information to retrieve from an input 112.

With continued reference to FIG. 1, processing module 144 and/or computing device is configured to generate a record 156 utilizing the at least a retrieved input 112. A "record," as used in this disclosure, is any computer protocol that facilitates, verifies, and/or enforces the negotiation or performance of an agreed-upon usage of at least a retrieved input. A record may include a contract covering an agreement between two or more parties regarding access rights for data stored in an immutable sequential data structure and/or an encrypted datastore as described in this disclosure. A record 156 may allow the performance of a transaction without a third party. A record 156 may be stored as an encrypted proof-linked assertion 136 on an immutable sequential data structure 148. A record 156 may be trackable and irreversible. A record 156 may be partially and/or fully self-executing, and/or self-enforcing. In an embodiment, a record 156 may be formed and/or stored as an immutable sequential data structure 148 from an input 112 received from a remote device 116. For example, a record 156 may be formed for a stop loss between an insurance plan sponsor and an insurance company. In yet another non-limiting example, a record 156 may be formed between a plan sponsor and a beneficiary for a record 156 of health benefits. In yet another non-limiting example, a record 156 may be formed between a plan sponsor and a pharmacist for a formulary. In yet another non-limiting example, a record 156 may be formed between a beneficiary and a physician for a record 156 for a prescription. In yet another non-limiting example, a record 156 may be formed between a plan sponsor and a physician for a record 156 for membership.

With continued reference to FIG. 1, processing module 144 is configured to retrieve a first encrypted proof-linked assertion 136 relating to a first party and to retrieve a second encrypted proof-linked assertion 136 relating to a second party. Processing module 144 executes a record 156 between the first party and the second party utilizing the first encrypted proof-linked assertion 136 and the second encrypted proof-linked assertion 136. Processing module 144 stores an executed record 156 on an immutable sequential data structure 148. Immutable sequential data structure 148 includes any of the immutable sequential data structure 148 as described herein.

With continued reference to FIG. 1, processing module 144 is configured to perform a machine-learning process 160 utilizing at least a retrieved input 112. A "machine learning process," as used in this disclosure, is a process that automatedly uses a body of data known as "training data" and/or a "training set" to generate an algorithm that will be performed by a computing device/module to produce outputs given data provided as input 112; this is in contrast to a non-machine learning software program where the commands to be executed are determined in advance by a user and written in a programming language. A machine-learning process may be implemented, without limitation, in any manner as described below.

Still referring to FIG. 1, machine-learning processes and/or models generated as described in this disclosure may include machine-learning processes and/or models generated using federated learning. "Federated learning," as used in this disclosure, is a cross-institutional, collaborative, and privacy-preserving approach to training machine learning algorithms. This is in contrast to traditional machine-learning, where algorithms train on data that has been collected and loaded to a centralized repository, in federated learning, the algorithm may travel and train on datasets found on each node, eliminating any need for data to be extracted from its home location. Any machine-learning process may be used in a federated learning process, including any machine-learning process described in this disclosure.

With continued reference to FIG. 1, processing module 144 is configured to receive a parameter list data input, which may alternatively be referred to as a formulary data input 164. A "formulary data input," as used in this disclosure, is any data including any numerical, character, and/or symbolic data pertaining to a drug formulary. A drug formulary includes any list of drugs including both prescription and non-prescription drugs that are covered by an insurance plan, including for example a self-insured employer covered insurance plan. Processing module 144 analyzes the formulary data input 164 to create fragments of the formulary input 112 data. A "fragment," as used in this disclosure, includes any component of a formulary data input 164. A component may include one or more pieces of data pertaining to a formulary data input 164. For instance and without limitation, a formulary data input 164 that contains a drug, the date the drug was filled at a pharmacy, and the treatment that the drug was utilized for may be broken down into three separate fragments that include a first fragment containing the drug, a second fragment containing the date the drug was filled at a pharmacy, and a third fragment containing the treatment that the drug was utilized for. In an embodiment, one or more fragments may be stored on an immutable sequential data structure 148. Processing module 144 is configured to perform a second machine-learning process 160 utilizing the fragment of the formulary input 112 data. In an embodiment, processing module 144 may retrieve one or more stored fragments to utilize to perform a second machine-learning process 160. Second machine-learning process 160 includes any of the machine-learning process 160 as described above in more detail. Processing module 144 generates a record 156 utilizing a second machine-learning process 160. A record 156 includes any of the record 156 as described above in more detail. In an embodiment, a record 156 may be stored on an immutable sequential data structure 148. In an embodiment, a such a record 156 may include a formulary record 156 generated between a first party consisting of a sponsor, and a second party consisting of one or more pharmacies.

With continued reference to FIG. 1, processing module 144 is configured to transmit the record 156 to a plurality of outposts 168. An "outpost," as used in this disclosure, includes any pharmacy. A pharmacy includes any store where prescription and/or non-prescription drugs are dispensed and sold. In an embodiment, an outpost may include a server and/or a computing device operated by a pharmacy. In an embodiment, processing module 144 may transmit a record 156 to a plurality of pharmacies. Processing module 144 receives a communication from the plurality of outposts. A "communication," as used in this disclosure, includes any response generated by an outpost 168, as a response to a record 156 transmitted to an outpost 168. A communication may include data such as available drugs to be filled at an outpost 168, adverse side effects that may occur from a drug, and/or pricing information about a drug include the retail price, and/or the average wholesale cost (AWP). Processing module 144 transmits the communication from the plurality of outpost 168 to a sponsor. A "sponsor" as used in this disclosure, includes any employer or organization that offers a group health plan to one or more members. A group health plan may include pharmacy benefits. Processing module 144 may transmit a communication from the plurality of outposts to a sponsor utilizing any network methodology as described herein. Processing module 144 receives a decision referencing the communication from the plurality of outposts from the sponsor. A decision may contain an approval of a formulary record 156. A decision may contain a rejection. A rejection may contain a counteroffer such as a request for a discount for a particular drug or list of drugs from an outpost 168. For example, a rejection may contain proof of volume and/or proof of projected need of certain medications by plan members, and as such the plan sponsor may request a discount.

With continued reference to FIG. 1, processing module 144 is configured to receive a search query. A "search query," as used in this disclosure, is any input 112 containing a request for information that may be contained within system 100. For example, a search query may be generated by a doctor who may enter information into a search query such as diagnostic information for the patient and a proposed drug, with a question to know if the proposed drug will be covered by the patient's formulary, how much it will cost, as well as a list of other medications that can be used if the proposed drug is not covered. Processing module 144 retrieves a plurality of input 112 stored within the processing module 144 matching the search query and calculates a third machine-learning process utilizing the plurality of retrieved input 112. Retrieved input 112 may include input 112 containing protected data 128 stored within an immutable sequential data structure 148 and input 112 containing data stored in an encrypted datastore 140. Third machine-learning process 160 may include any of the machine-learning process 160 as described above in more detail. Processing module 144 may transmit an output generated utilizing a third machine-learning process to a remote device 116. For example, a third machine-learning process 160 that determines if an identified drug will be covered by a formulary or not may be transmitted to a remote device 116 operated by a doctor who generated an initial search query to ask if a proposed drug would be covered for a patient of the doctor.

Still referring to FIG. 1, a search query may take any suitable form, including a word, phrase, or other textual form. A search query may include and/or be converted into a vector representing a textual form of search query in a vector space, including and without limitation as described above. Search query may be used to find related vectors, documents containing and/or represented by related vectors, or the like. Alternatively or additionally, search query may be used to retrieve one or more data records from a database or other datastore as described in this disclosure; classification and/or vector comparison may be used to select an optimal answer and/or set of answers for query from such results.

With continued reference to FIG. 1, processing module 144 is configured to receive an input 112 containing a requested treatment 172. A "requested treatment," as used in this disclosure, is any drug that is being considered to be used to treat a user. A requested treatment 172 may be received from a remote device 116. A requested treatment 172 may be generated by a doctor, such as when a doctor is considering treating a user with a specific medication. A requested treatment 172 may be generated by a user, such as if a user wants to know if a particular treatment will be covered by a user's formulary. Processing module 144 retrieves from an immutable sequential data structure 148 a numerical parameter, which may include without limitation a price quote for the requested treatment 172. In an embodiment, one or more outpost 168 may store pricing information relating to a drug within an immutable sequential data structure 148. In an embodiment, a formulary containing pricing information for a drug may be stored as a record 156 within an immutable sequential data structure 148. Processing module 144 may reject a price quote retrieved from an immutable sequential data structure 148 and locate a treatment with an acceptable price quote using a fourth machine-learning process 160. Processing module 144 may reject a price quote when the price quote exceeds what a user is willing to pay for a requested treatment 172 and/or when a requested treatment 172 is not covered by a formulary and must be paid out of pocket by a plan member. Processing module 144 locates a treatment with an acceptable price quote using a fourth machine-learning process 160. A fourth machine-learning process 160 includes any machine-learning process 160 as described above. In an embodiment, one or more patient and/or provider preferences regarding price quotes may be stored within processing module 144. For example, a user may provide input 112 that may be stored within processing module 144 concerning what is an acceptable price quote and what price quotes are not acceptable and can be rejected. For example, a user may be willing to spend $50 for a requested treatment 172 but not $250.

With continued reference to FIG. 1, processing module 144 may be configured to generate and/or suggest a requested treatment 172 utilizing a fifth machine-learning process, such as when a doctor or patient may not know what treatment should be utilized for a particular disease state. Processing module 144 may retrieve an element of user data stored within processing module 144. An element of user data may include any data pertaining to a user that may be stored as protected data 128 and/or non-protected data. Processing module 144 generates an input 112 containing a requested treatment 172 using the retrieved element of use data and a fifth machine-learning process 160. A fifth machine-learning process 160 includes any machine-learning process 160 as described above in more detail.

With continued reference to FIG. 1, processing module 144 is configured to identify a record 156 wherein the record 156 contain an unfilled prescription. An "unfilled prescription," as used in this disclosure, includes any prescription that has not been dispensed and/or sold to a user at a pharmacy. In an embodiment, a record 156 containing an unfilled prescription may be stored within an immutable sequential data structure 148. Processing module 144 receives an input 112 from a user rejecting a prescription. Processing module 144 may receive an input 112 from a user entered at a remote device 116 or entered on a graphical user interface 120 as described above. A user may reject a prescription when the user does not want to fill a prescription because the prescription may be too expensive, or when a prescription may contain an ingredient that the user may be allergic to. Processing module 144 may offer a second biochemical identification, which may include, for instance, a substitute prescription, using a sixth machine-learning process 160. A substitute prescription may include any medication suggested to be taken by a user in lieu of the unfilled prescription. Sixth machine-learning process 160 includes any machine-learning process 160 as described above in more detail. Processing module 144 may offer a substitute such as by transmitting to a remote device 116 operated by a user, the suggested substitute, utilizing any network methodology as described herein. Processing module 144 receives an input 112 accepting the substitute. In an embodiment, a substitute may be accepted by a user and/or a third-party acting on behalf of the user such as the user's doctor or the user's spouse. Processing module 144 creates a record 156 wherein the record contains an indication of the unfilled prescription and the prescription filled that contained the substitute. In an embodiment, the created record 156 may be stored in an immutable sequential data structure 148.

With continued reference to FIG. 1, processing module 144 is configured to identify a record 156 wherein the record 156 contains an unfilled prescription. Processing module 144 receives an input 112 from a user wherein the input 112 contains an indication to proceed with filling a prescription. An input 112 may be generated from a user at a remote device 116. Processing module 144 creates a record 156 wherein the record 156 contains an indication of the prescription filled without a substitution. Such a record 156 may be stored on an immutable sequential data structure 148.

Referring now to FIG. 2, an exemplary embodiment of an immutable sequential data structure 200 is illustrated. Data elements are listing in immutable sequential data structure 200; data elements may include any form of data, including textual data, image data, encrypted data, cryptographically hashed data, and the like. Data elements may include, without limitation, one or more at least an encrypted proof-linked assertion 136. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential data structure 200 records a series of at least a posted content in a way that preserves the order in which the at least a posted content took place. Immutable sequential data structure may be accessible at any of various security settings; for instance, and without limitation, immutable sequential data structure may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential data structure 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential data structure 200 may preserve the order in which the at least a posted content took place by listing them in chronological order; alternatively or additionally, immutable sequential data structure 200 may organize digitally signed assertion 204 into sub-listings 208 such as "blocks" in a blockchain, which may be themselves collected in an immutable sequential order; digitally signed assertion 204 within a sub-listing 208 may or may not be immutable sequential. The ledger may preserve the order in which at least a posted content took place by listing them in sub-listings 208 and placing the sub-listings 208 in chronological order. The immutable sequential data structure 200 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential data structure 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential data structure 200, once formed, may be inalterable by any party, no matter what access rights that party possesses. For instance, immutable sequential data structure 200 may include a hash chain, in which data is added during a successive hashing process to ensure non-repudiation. Immutable sequential data structure 200 may include a block chain. In one embodiment, a block chain is immutable sequential data structure 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential data structure 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be flat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential data structure 200 may contain a record or at least a posted content describing one or more addresses that receive an incentive, such as virtual currency, as the result of successfully mining the sub-listing 208.

Still referring to FIG. 2, incentive structures and/or other protocols used in combination with any embodiment of immutable sequential data structure may be designed according to game theory or other theoretical constructs to harness incentives for a given application area while encouraging desirable behavior and/or behavior tending to preserve integrity of the immutable sequential data structure and/or security protocols enacted thereon, and/or counteracting and/or disincentivizing undesirable behavior and/or behavior tending to undermine integrity of the immutable sequential data structure and/or security protocols enacted thereon.

In some embodiments, and still referring to FIG. 2, a lack of knowledge concerning incentives may represent a principal obstacle to implementing federated learning at scale. Adversaries may attempt to reverse engineer algorithms to extract sensitive data or simply feed bad data to "pollute" federated models. A token-based data standardization may be employed as a way to mitigate such threats to federated learning models, where a token may come in the form of a smart contract, for instance as with Ethereum's ERC-20 and ERC-721 tokens. Understanding incentives and motivations to shield against fraud and other potential threats to data integrity may aid in goals and/or aspects of a service supported by immutable sequential data structure, such as financial as well as clinical aspects of the service.

Continuing to refer to FIG. 2, incentives based on percentage of contribution to a degree of medical efficacy, saving in costs, and/or increase in generated value as compared to a typical transaction given transaction parameters. "Typical transaction" values may be determined using a machine-learning model. Machine-learning mode may be trained using training data correlating transaction parameters with medical efficacy, costs saved and/or value generated. Medical efficacy, savings of costs incurred and/or value generated may similarly or additionally be correlated by training examples with one or more parameters and/or data associated with transactions; such training examples may be used to train an alternative or additional machine-learning model, permitting cost savings and/or increases in value to be determined directly from transaction data and/or parameters, for instance and without limitation as recorded and/or saved on immutable sequential listing. Alternatively or additionally relationships between transaction parameters and/or other transactional data and medical efficacy, cost savings and/or increases in generated value may be determined by aggregating such costs savings and/or increases in generated value over a plurality of past transactions having one or more characteristics in common with a current transaction, for instance and without limitation by averaging using an arithmetic mean, geometric mean, or the like.

In an embodiment, and still referring to FIG. 2, a percentage of overall value, costs saved and/or increased value from a transaction may be paid to one or more participants in transaction; percentage may be divided evenly between all participants. Alternatively or additionally, a percentage paid to each participant may be calculated based on a determined contribution by each participant. Participants' contributions to savings may be determined, without limitation, by comparison of a cost charged, value received, and/or quantity of time spent as a result of a given participant's participation to a typical such cost charged, value received, and/or quantity of time spent for a similar transaction, as determined by any form of aggregation and/or machine-learning as described above. Alternatively or additionally, a participant's percentage may be determined by training a machine-learning model, using any machine-learning algorithm as described in this disclosure and training data correlating transaction parameters, transaction data, and/or participant contributions as recorded on and/or saved to immutable sequential data structure and medical efficacy, cost savings and/or increased value; participant contributions, which may include costs charged, values received, quantity of time spent, and/or any other data, may be input to such machine-learning model, which may output percentage.

Further referring to FIG. 2, incentives such as percentages of overall value, costs saved, and/or increased value over typical transactions may alternatively or additionally be calculated based on one or more identified traits of transaction participation that are performed. For instance percentages and/or other incentives may be calculated and/or generated to reward participants for thorough, timely, and/or clear documentation, for efficient performance of tasks, or the like. Contributions of each participant may be recorded at or on and/or saved in immutable sequential data structure. As a non-limiting example, patients may be given incentives and/or percentages in the form of discounts and/or payments to such patients where patients provided greater quantities of personal health history and/or other documentation, and/or a greater proportion thereof. As a further non-limiting example, pharmacists may be provided incentives for reduced costs and/or increased efficacy in providing pharmacological advice, filling prescriptions, finding and/or proposing therapeutic alternatives, or the like. Incentives may be provided in any flat currency, virtual currency, cryptocurrency, and/or other modality for transfer of value.

Still referring to FIG. 2, incentives may alternatively or additionally be computed based on one or more implementations of game theory. For instance, and without limitation, a game-theoretic model representing incentives and disincentives affecting each type of participant in a given transaction may be received and/or generated. Game-theoretic model may include data representations of incentives and disincentives calculated as linear equations of transaction parameters and/or parameters affecting participants. Such equations may be generated using machine-learning algorithms as described in this disclosure, for instance and without limitation using training data correlating each such parameter with data indicating participant actions and/or characterizing a degree to which each participant behaves in manners to be incentivized, based on previous incentive calculations and/or transaction parameters. Incentive calculations may be performed to maximize overall effect of incentives for a set of participants and/or participant types, where maximization may be determined using one or more optimization algorithms, such as linear optimization algorithms, mixed-integer optimization algorithms, greedy optimization algorithms, or the like. This may produce incentives as a function of likely effect on behavior of a participant, where a degree of effect on behavior, and a degree of effect of behavior on medical efficacy, value generated and/or costs saved. For instance, incentives may have only a weak effect on improving participation of doctors, despite doctors' comparatively large impact on medical efficacy and/or cost savings, while incentives may strongly affect both billing specialists' and medical technicians' efforts to improve one or more of medical efficacy, value generated and/or costs saved; meanwhile, billing specialists may have a high degree of impact on value generated and/or costs saved with a relatively low effect on medical efficacy, and medical technicians may have great potential to improve the latter, but little to improve the former. Consequently, and continuing the above-described example, incentives may be generated to greatly encourage medical technicians' efforts toward improved medical efficacy, to greatly encourage billing specialists efforts toward cost savings and value generation and have a lesser impact on physician behavior at all.

As an illustrative and non-limiting example, and further referring to FIG. 2, healthcare systems may be inherently hierarchical rather than democratic. Incentive structures addressing an interplay of external incentives and intrinsic motivations that can impact a balance of power among roles in this hierarchy may improve integrity of immutable sequential data structures and/or federated learning supported therewith. For instance, and without limitation, processes and/or protocols used in system 100 may be designed to respect traditional rolesin the healthcare hierarchy, but this may not preclude structuring such services to influence traditional power dynamics found among these roles. A service's goal in this regard may be to encourage equilibria of intrinsic motives such as power, affiliation, achievement, or the like while incorporating incentive structures that encourage multi-party cooperation over competition. Examples of relationships in healthcare hierarchies that stand to benefit from increased cooperation may include patient-physician relationships, patient-pharmacist relationships, relationships among junior and senior clinicians, relationships between clinicians and administrators, and most generally, relationships between actors working for independent organizations. While patients and their families may not have formal training in healthcare, theyremain a valuable resource of information; one survey showed "between 50 and 70 percent of respondents reported hesitation when voicing concerns about possible mistakes, mismatchedcare goals, confusing or conflicting information" Another study found "that junior doctors say they rarely see their seniors report or act on errors—their own or those of others." Incentive structures may therefore be configured to consider possible motives to obstruct error reporting inhealthcare, as it may be inevitable that errors will be made.

With continued reference to FIG. 2, game theory, insofar as it is a formal approach to modeling scenarios that takes various player perspectives into consideration, may provide useful frameworks for analyzing shared decision-making and error reporting. Clearly, however, while continuity in care relationships correlates with quality care, continuity in itself may not be a cause of good care. Further, early game theory assumed players were "rational", which experimental applications have shown is not conducive to making accurate predictions about trust, cooperation, and care quality. Emergent game theoretic frameworks that take unequal roles and intrinsic motivations into account may therefore represent more promising avenues for federated machine learning simulations of outcomes.

With continued reference to FIG. 2, where two entities simultaneously create new sub-listings 208, immutable sequential data structure 200 may develop a fork; protocol may determine which of the two alternate branches in the fork is the valid new portion of the immutable sequential data structure 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential data structure 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential data structure 200.

Still referring to FIG. 2, additional data linked to at least a posted content may be incorporated in sub-listings 208 in the immutable sequential data structure 200; for instance, data may be incorporated in one or more fields recognized by block chain protocols that permit a person or computer forming a at least a posted content to insert additional data in the immutable sequential data structure 200. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

In an embodiment, and without limitation, immutable sequential data structure may include a "contract-based" model to support formal mathematical modeling and a "federated", interorganizational prescription history on immutable sequential data structure. Any data that goes on immutable sequential data structure may ultimately be selected based on whether or not such data can be used toward reducing interorganizational uncertainty. General criteria for committing data. To immutable sequential data structure may include, without limitation, (1) whether a transaction representing and/or involving data involves two or more autonomous parties, one of which could be a patient, or institutions; and/or (2) whether the transaction's output is required as input for a formal validation of a future interorganizational transaction to move forward in the prescription lifecycle. Given a "contract-based" model, any data in a smart contract may be stored and/or represented on immutable sequential data structure but may not necessarily be universally accessible. For example, a prescription may be committed as a contract between a provider and a patient on-chain, but only parties who are bound by that contract may have an ability to retrieve and unencrypt it; retrieval and/or decryption may be performed by a node and/or other device upon reception and validation of credentials of parties authorized to view data or may be regulated by provision of decryption keys only to such parties. Network agreements and formularies, in another non-limiting example, may be accessible to anyone within a given Health Network, including members such as patients who do not have authority to make administrative decisions regarding these contracts, in the interest of interorganizational transparency.

In an embodiment, and still referring to FIG. 2, an advantage of using an immutable sequential data structure instead of a centralized data warehouse for storage of some data, such as pharmacy benefit management data, may result from coordinating complex yet logically interrelated workflows among independent health information systems. For instance, solutions sounding in immutable sequential data structures supporting a contract-based model may offer a means to run multistage processes including logical constraints and data manipulation directly on the immutable sequential data structure and/or a local copy and/or representation thereof, as opposed to a transaction-based model, which may be better suited for tracking and transfer of digital assets.

Further referring to FIG. 2, immutable sequential data structure and/or system may be designed to furnish a shared business logic foundation in the form of a smart contract framework, while allowing independent "lowland" actors sufficient autonomy to manage complex decisions within their respective domains. Meanwhile, a unified, private account of each patient journey may emerge, backed up through on-chain transactions; for this account to be of value, establishing consensus around validity of data in this shared account may be useful.

Still referring to FIG. 2, immutable sequential data structures, and/or other elements of system, may instantiate data and/or data structures such as records as defined above in the form of smart contacts. A "smart contract," as used in this disclosure, is a computerized transaction protocol that executes terms of a contract. While an immutable sequential data structure may be a link of transactions between parties which are batched together into a chain, smart contracts may enable such transactions to be executed according to programmatically encoded contractual terms. Given that immutable sequential data structures and smart contracts are distinct concepts, not all data from transactions executed through smart contracts need to be committed to an immutable sequential data structure and/or a database linked thereto, although a smart contract in an immutable sequential data structure setting may be implemented as a script embedded on the immutable sequential data structure. In some embodiments, smart contracts may be useful in that they may allow general purpose computations to occur in tandem with an immutable sequential data structure. Smart contracts may excel when they are implemented into managing data-driven interactions between entities on the network. This ability of smart contracts to excel nevertheless may rest on whether their logic relies on formal or informal models.

Continuing to refer to FIG. 2, automation via smart contracts may mitigate added internal complexity in an employer's administrative processes; in some embodiments, smart contracts running computations with an objectively verifiable result may do so while decreasing uncertainty about other independent parties to the contracts. For instance, in an exemplary case of online stock tips, it may be objectively verifiable that a publisher fulfills an obligation to release a newsletter by 7 AM every trading day; on the other hand, granting customers a right to cancel subscriptions without penalty because of low quality content may represent a subjective requirement. A publisher may design a computerized protocol that automatically "validates" content quality by demonstrating that on average, following stocktips leads to significantly greater investment income for subscribers, while a particular subscriber may bring data showing repetitive losses after following stock tips; these different accounts yield conflicting conclusions, increasing uncertainty. In a non-limiting example of drug formularies, an employer may use results of clinical studies to show that on average, a generic medication is as safe and effective as its more expensive, branded equivalent, but for aparticular employee, a generic may not be as effective or may cause harmful side effects observed only in a minority of patients.

With further reference to FIG. 2, smart contracts and/or record may be designed, configured, and/or programmed using a domain-specific language, defined as a programming language having application limited to a particular domain of use, such as generation and/or manipulation of smart contracts. Programming contracts according to a declarative paradigm may be preferable, to specify contractual obligations and how they are to be enforced without detailing how contracting organizations are to meet these obligations. As an example of a domain-specific language used for smart contract generation, smart contract may be programmed in DAML (Digital Asset Modeling Language), an enterprise grade smart contract modeling language based on the principles of Haskell. Smart contracts for enterprise-grade finance applications may represent a domain for which DAML was originally developed. DAML features may include: (1) strongly typed templates, which may essentially be classes corresponding to contracts and (2) built-in conventions for user permissions at a contract level. A key advantage of strongly typed templates may include having higher certainty that operations run on instances of that class will or will not complete as expected, since a number of possible future outcomes may be reliably reasoned about. DAML as a language models domain-specific concepts such as parties, rights, authorizations and/or obligations.

In an embodiment, and further referring to FIG. 2, any record and/or smart contract may be included in a suite of contracts that reference and reinforce each other. For example, agreement on a formulary model may be predicated on a prior, more general agreement at a level of a care network. In turn, functions defined under a more private agreement of a plan policy shared between a payer and an individual beneficiary may rely on formulary outputs.

Still referring to FIG. 2, a DAML contract may change state whenever a signatory or an observer exercises their pre-programmed right to a choice, defined within a contract template. With each state change, a contract may be "archived", and a new contract instance may be generated and synchronized to each party's private data store, with a new contract identifier and new contract data. Apart from contract identifiers, DAML may for creation of contract "keys" to serve as a stable reference to a contract object, but only among active, or non-archived, contracts. For purposes of referencing a formulary from which a new plan policy was created, relying on a contract key to preserve a link between those contracts may be sufficient, solong as both contracts remain active; this DAML feature may encourage developers to design applications that only rely on active contracts, since data embedded in active contracts effectively represents a view into a current state of global synchronization log hosted on an immutable sequential data structure. This approach may be suited to handling streams of real-time financial updates, but from a clinical standpoint, an ability to access an archived prescription may be desirable, if not necessary in many clinical use case scenarios. The archive of a patient's prescriptions is the backbone of that patient's private medication history and should be accessible to physicians and pharmacists in the network, given that the patient (the owner of those prescriptions) has knowledge of their access rights and has granted consent. In an embodiment, contracts and/or records may include a "Medical History" contract, under ownership of a patient, for preserving data relevant to the patient's private history. A patient may opt to share this contract with his or her preferred pharmacists and clinicians; if the patient never shares this history, this contract data may still be accessible to physicians that have written scripts and pharmacists who have filled scripts for the patient, as these transactions may trigger automatic updates to the Medical History contract. In other words, a patient may not be able to change or update a Medical History directly but may be able to regularly viewand confirm updates once he or she has consented to treatments.

Figure 3:
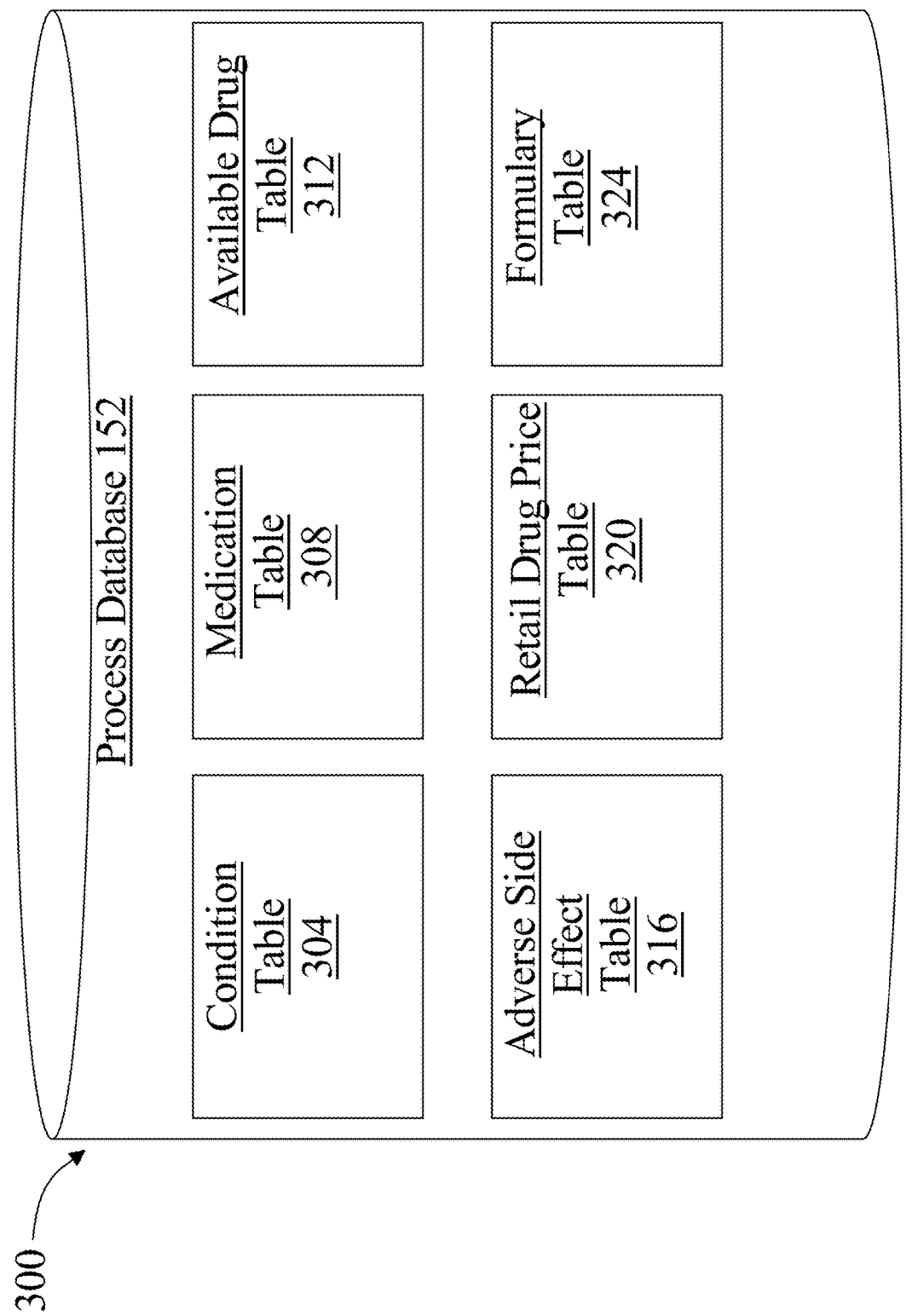
FIG. 3 is a block diagram illustrating an exemplary embodiment of a process database.

Referring now to FIG. 3, an exemplary embodiment 300 of process database 152 is illustrated. Process database 152 may be implemented as any data structure as described above in more detail in reference to FIG. 1. Process database 152 may be utilized to store one or more elements of non-protected data 132 is a block diagram illustrating an exemplary embodiment of an immutable sequential data structure of digitally signed assertion as described above in more detail in reference to FIG. 1. One or more tables contained within process database 152 may include condition table 304; condition table 304 may contain a list of conditions that a user may have been or may be currently diagnosed with. One or more tables contained within process database 152 may include medication table 308; medication table 308 may contain a list of medications that a user may have been or may currently be currently consuming. One or more tables contained within process database 152 may include available drug table 312; available drug table 312 may include a list of drugs available to be dispensed and/or sold at one or more pharmacies. One or more tables contained within process database 152 may include adverse side effect table 316; adverse side effect table 316 may include a list of adverse side effects experienced by a user from one or more medications. One or more tables contained within process database 152 may include retail drug price table 320; retail drug price table 320 may include a list of retail drug prices for one or more prescription and/or non-prescription drugs. One or more tables contained within process database 152 may include formulary table 324; formulary table 324 may include information relating to one or more formularies including for example drugs included on a particular formulary, and/or average wholesale price (AWP) for one or more drugs contained on a formulary.

Figure 4:
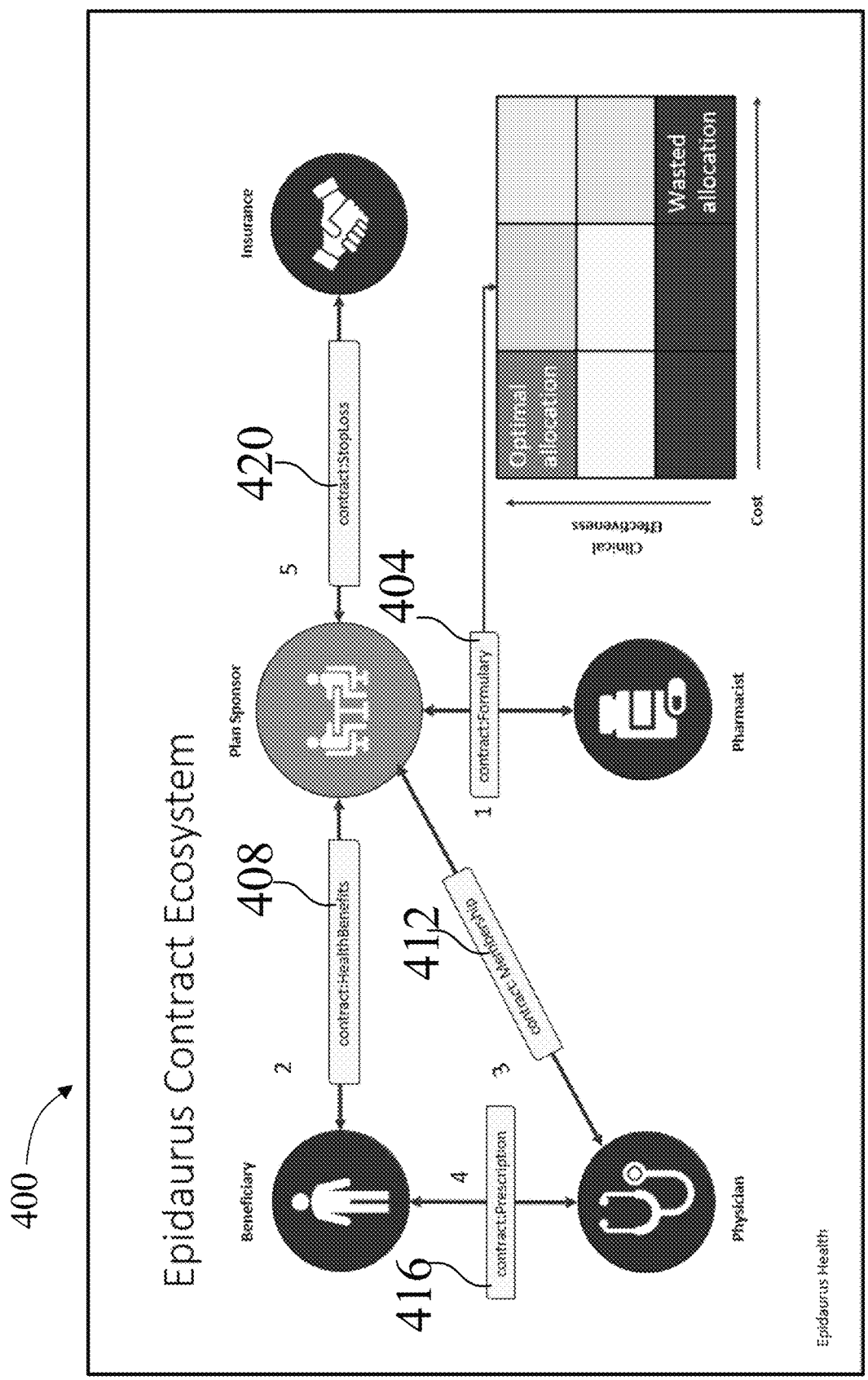
FIG. 4 is a block diagram illustrating an exemplary embodiment of a record.

Referring now to FIG. 4, an exemplary embodiment 400 of various records 156 that may be executed and stored within immutable sequential data structure 148 is illustrated. In an embodiment, a record 404 may be executed and stored on immutable sequential data structure 148 between a first party consisting of a plan sponsor and a second party consisting of a pharmacist and/or pharmacy. Record 404 between a plan sponsor and a pharmacist and/or pharmacy may consist of a formulary. Record 404 may be updated in real time as changes to the formulary record 156 may occur. In an embodiment, a record 408 may be executed and stored on immutable sequential data structure 148 between a first party consisting of a plan sponsor and a second party consisting of a beneficiary or user. Record 408 between a plan sponsor and a beneficiary may consist of a health benefit record 156. Record 408 may be updated in real time as changes to the health benefits record 408 may occur. In an embodiment, a record 412 may be executed and stored on immutable sequential data structure 148 between a first party consisting of a plan sponsor and a second party consisting of a physician. Record 412 between a plan sponsor and a physician may consist of a member record 156. Record 412 may be updated in real time as changes to membership may occur. In an embodiment, a record 416 may be executed and stored on immutable sequential data structure 148 between a first party consisting of a beneficiary and a second party consisting of a physician. Record 416 between a beneficiary and a physician may consist of a prescription. Record 416 may be updated in real time as a prescription may be modified, filled, dispensed, and/or subsequent prescriptions may be added to an existing regimen. In an embodiment, a record 420 may be executed and stored on immutable sequential data structure 148 between a first party consisting of a plan sponsor and a second party consisting of an insurance company. Record 420 between a plan sponsor and an insurance company may consist of a stop loss record 156. Record 420 between a plan sponsor and an insurance company may be updated in real time as a stop loss may be modified.

Figure 5:
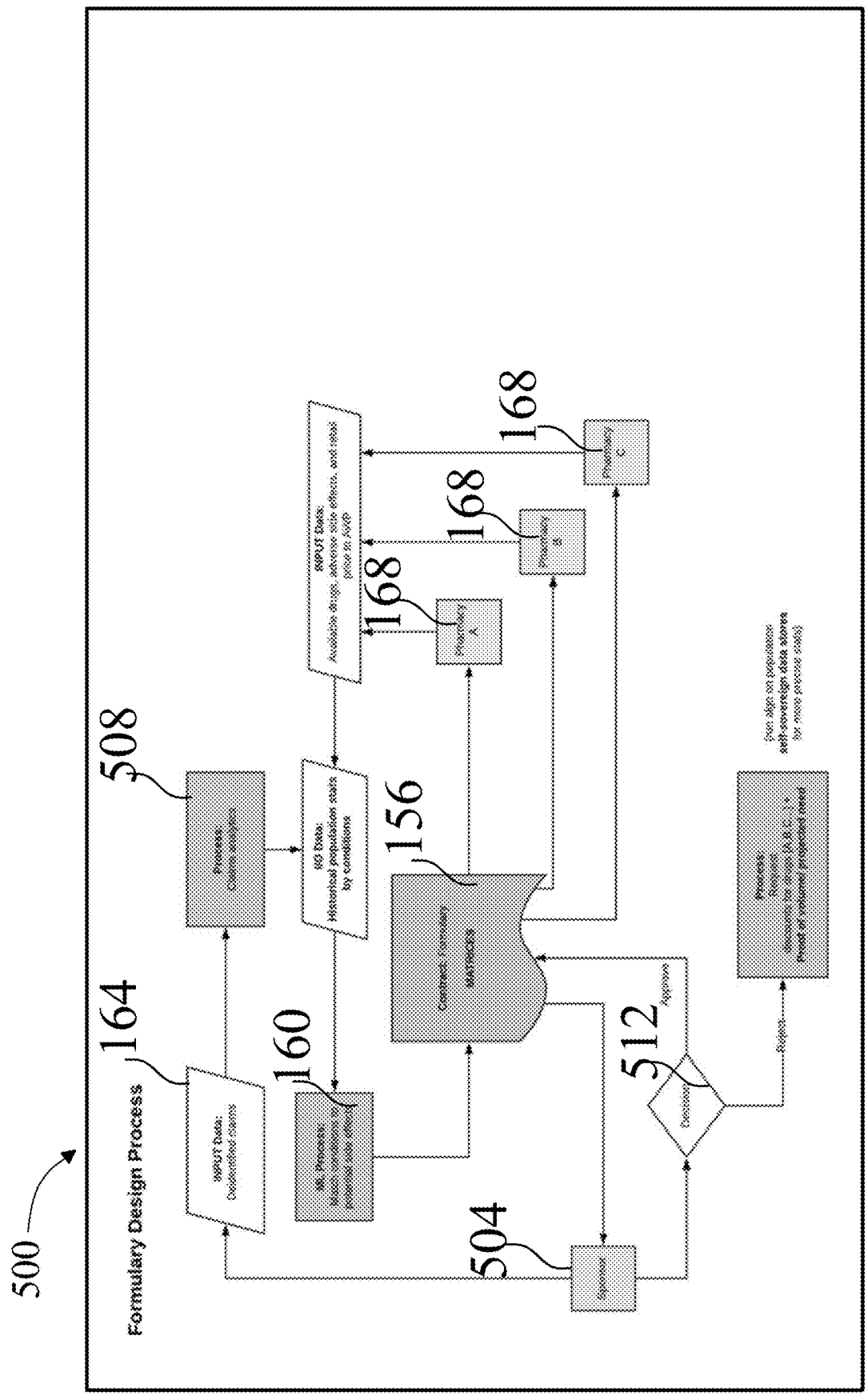
FIG. 5 is a block diagram illustrating an exemplary embodiment of a formulary data input.

Referring now to FIG. 5, an exemplary embodiment 500 of a formulary input 112 is illustrated. In an embodiment, computing device 104 receives a formulary data input 164. Formulary data input 164 includes any of the formulary data input 164 as described above in more detail in reference to FIG. 1. For example, a formulary data input 164 may contain one or more deidentified claims. In an embodiment, a formulary data input 164 may be generated by a plan sponsor 504. A plan sponsor 504 includes any of the plan sponsors as described above in more detail in reference to FIG. 1. Computing device 104 analyzes the formulary data input 164 to create fragments 508 of the formulary data input 164. Fragments include any of the fragments as described above in more detail in reference to FIG. 1. Computing device 104 performs a second machine-learning process 160 utilizing the fragments 508 of the formulary data input 164. Computing device 104 generates a record 156 utilizing the second machine-learning process 160. In an embodiment, the record 156 may contain a formulary, one or more updates and/or modifications to a formulary, and the like. Computing device 104 may transmit the record 156 containing a formulary to a plurality of outpost 168. Outpost 168 include any of the outpost 168 as described above in more detail in reference to FIG. 1. Computing device 104 receives a communication from the plurality of outpost. A communication includes any of the communications as described above in more detail in reference to FIG. 1. Computing device 104 transmits the communication from the plurality of outpost 168 to the plan sponsor 504. Computing device 104 receives a decision 512 referencing the communication from the plurality of outpost 168 from the sponsor. In an embodiment, a decision 512 may approve the communication from the plurality of outpost. In an embodiment, a decision 512 may reject a communication from the plurality of outpost 168 and may request a different price negotiation for a drug contained on a formulary, for example.

Figure 6:
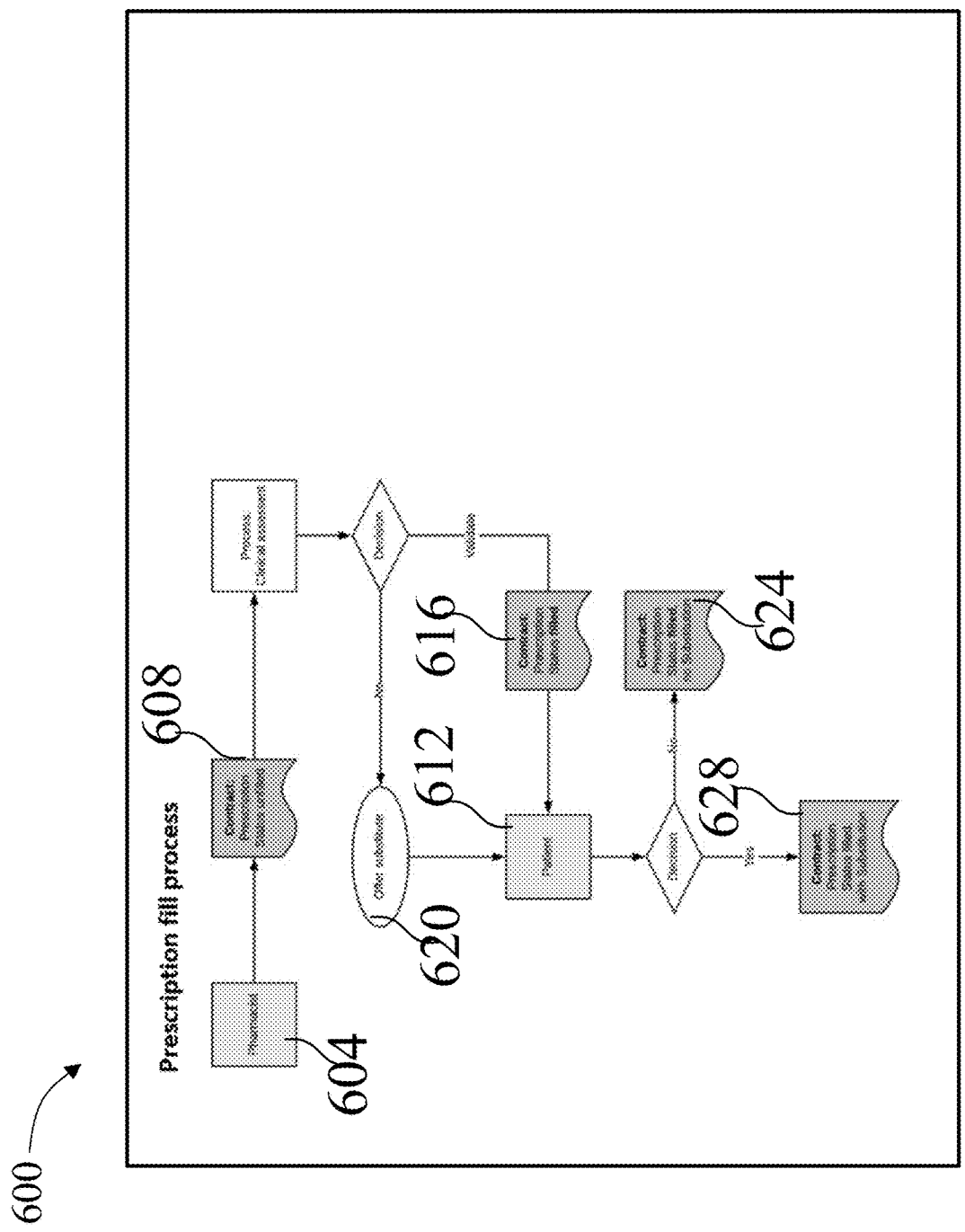
FIG. 6 is a block diagram illustrating an exemplary embodiment of a prescription record.

Referring now to FIG. 6, an exemplary embodiment 600 of various records 156 that may be executed and/or updated during the filling of a prescription are illustrated. In an embodiment, a pharmacist 604 may generate a record 608 identifying a prescription for a user 612 as not being filled. A pharmacist may then perform a clinical assessment of a user, such as by speaking with the user on the phone to determine if a user 612 wishes to have the prescription filled. Upon seeking confirmation from the user 612, the pharmacist 604 may fill the prescription and a record 616 may be formed containing a status reflecting that the prescription was filled. In an embodiment, a user 612 may not wish to have a prescription filed, where a pharmacist may then offer a second biochemical identification, such as a substitute prescription 620, such as when the original prescription is not covered by the user's insurance plan and is too expensive for the user to pay out of pocket. In an embodiment, computing device 104 may identify a second biochemical identification such as a substitute prescription 620 utilizing one or more machine-learning process 160, including any of the machine-learning processes as described above in more detail in reference to FIG. 1. In an embodiment, a user 612 may reject a substitution and computing device 104 may generate a record 624 reflecting that the original prescription was filled without any substitution. In an embodiment, a user 612 may accept a substitution and computing device 104 may generate a record 628 reflecting that the prescription was filled containing a substitution.

Figure 7:
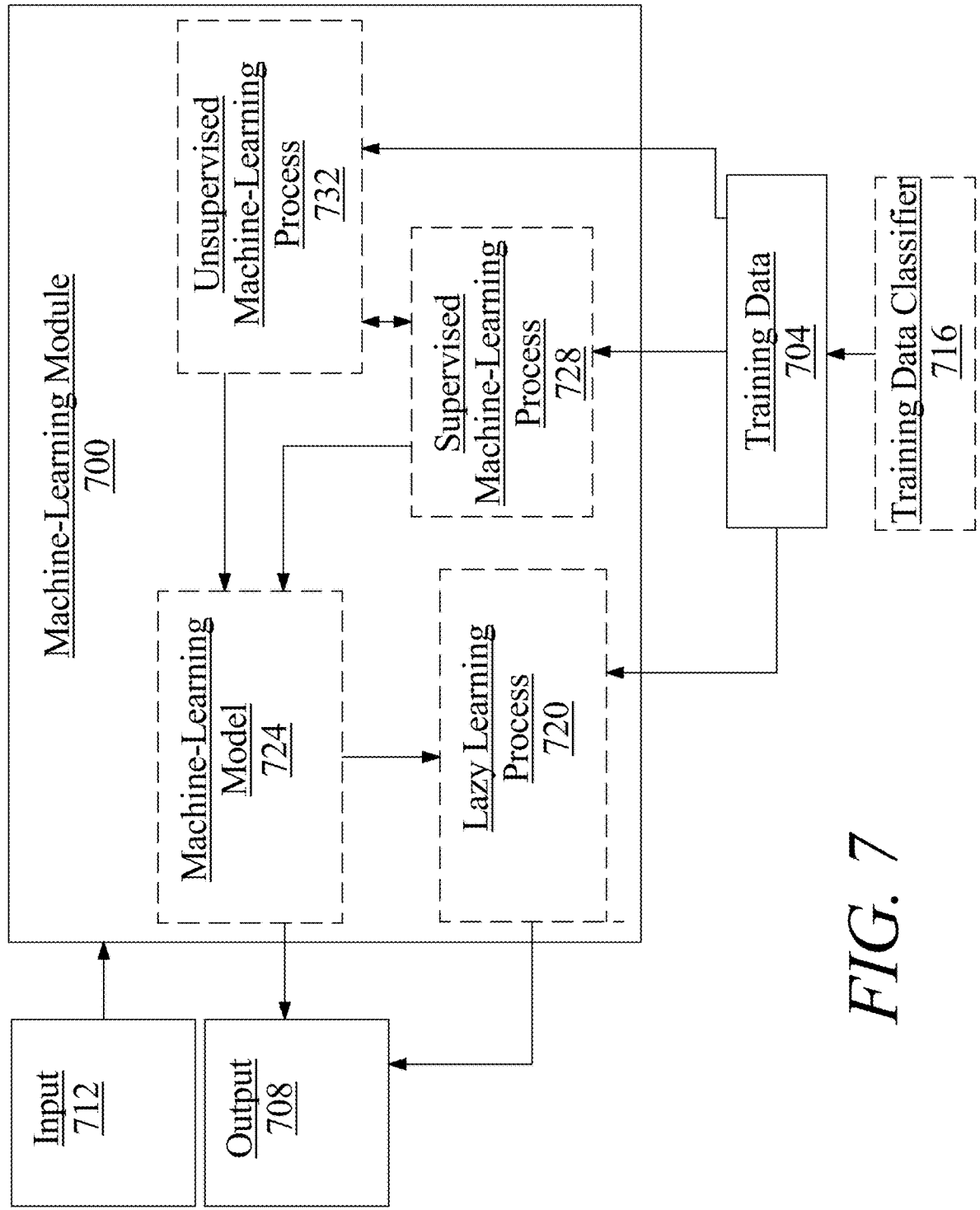
FIG. 7 is a block diagram illustrating an exemplary embodiment of a machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
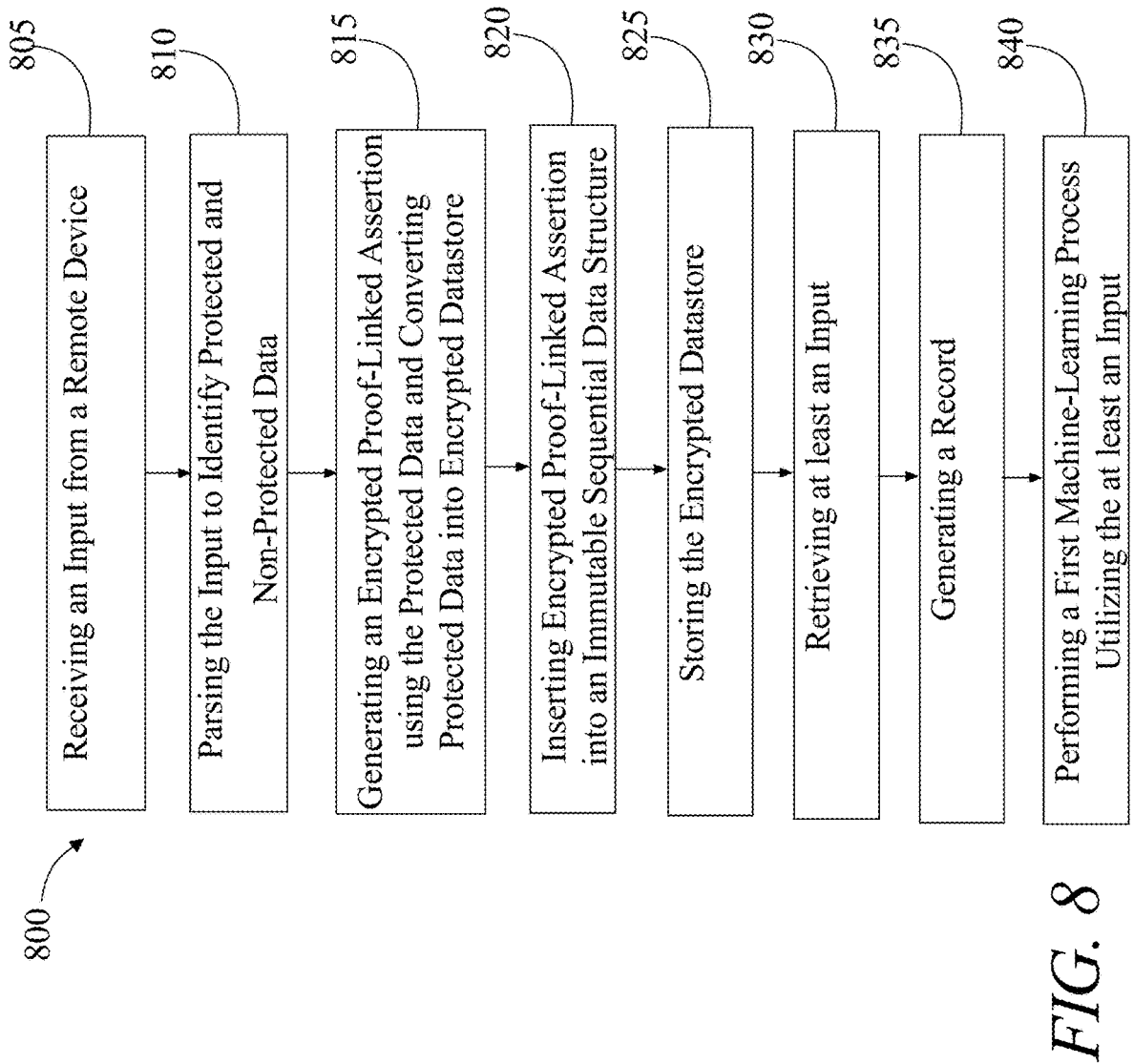
FIG. 8 is a flow diagram illustrating an exemplary embodiment of a method of an artificial intelligence synchronized distributed ledger.

Referring now to FIG. 8, an exemplary embodiment of a method 800 of an artificial intelligence synchronized distributed ledger is illustrated. At step 805 a computing device 104 receives an input 112 from a remote device 116. An input 112 includes any of the input 112 as described above in more detail in reference to FIGS. 1-6. An input 112 may pertain to a user's health records as described above in more detail in reference to FIG. 1. An input 112 may be generated by a user, a physician, a plan sponsor, a pharmacist, an insurance company and the like as described above in more detail in reference to FIG. 1.

With continued reference to FIG. 8, at step 810 a computing device 104 parses the input 112 to identify protected data 128 and non-protected data 132 contained within the input 112. Computing device 104 may parse the input 112 utilizing any of the methods as described above in more detail in reference to FIG. 1. In an embodiment, computing device 104 may utilizing language processing module 124 to extract one or more words and/or phrases that may pertain to protected data 128 and/or non-protected data 132. Protected data 128 includes any of the protected data 128 as described above in more detail in reference to FIG. 1. For instance and without limitation, protected data 128 may include personal health information (PHI) relating to a user, such as a user's name, date of birth, address, phone number and the like. Non-protected data 132 includes any of the non-protected data as described above in more detail in reference to FIG. 1. Non-protected data 132 may include any clinical observations relating to a user. For example, non-protected data 132 may include a list of medications including medication name, dose, frequency of use, and dates of fills at a pharmacy for medications that a user was prescribed.

With continued reference to FIG. 8, at step 815, a computing device 104 transforms protected data 128 into an encrypted proof-linked assertion 136 and non-protected data 132 into an encrypted datastore 140. An encrypted proof-linked assertion 136 includes any of the encrypted proof-linked assertion 136 as described above in more detail in reference to FIGS. 1-6. An encrypted datastore 140 includes any of the encrypted datastore 140 as described above in more detail in reference to FIGS. 1-6.

With continued reference to FIG. 8, at step 820, a computing device 104 inserts an encrypted proof-linked assertion 136 into an immutable sequential data structure 148. An immutable sequential data structure 148 includes any of the immutable sequential data structure 148 as described above in more detail in reference to FIGS. 1-6. Computing device 104 retrieves a first encrypted proof-linked assertion 136 relating to a first party and retrieves a second encrypted proof-linked assertion 136 relating to a second party. Computing device 104 executes a record 156 between the first party and the second party utilizing the first encrypted proof-linked assertion 136 and the second encrypted proof-linked assertion 136. A record 156 includes any of the record 156 as described above in more detail in reference to FIGS. 1-6. For example, a record 156 may be executed between a plan sponsor and a pharmacist to form a record 156 containing a drug formulary. In such an instance, drug formulary may be stored on immutable sequential data structure 148. In such an instance, any updates to formulary record 156 may be made in real time and loaded onto the immutable sequential data structure 148.

With continued reference to FIG. 8, at step 825 a computing device 104 stores the encrypted datastore 140. Computing device 104 may store one or more encrypted datastore 140 in process database 152 as described above in more detail in reference to FIGS. 1-6.

With continued reference to FIG. 8, at step 830 a computing device 104 retrieves at least an input 112. An input 112 includes any of the input 112 as described herein. In an embodiment, computing device 104 may retrieve an input 112 from an immutable sequential data structure 148 and/or from encrypted datastore 140.

With continued reference to FIG. 8, at step 835 a computing device 104 generates a record 156 utilizing the at least a retrieved input 112. Computing device 104 generates a record 156 utilizing any of the methods as described above in more detail in reference to FIGS. 1-6.

With continued reference to FIG. 8, computing device 104 receives a formulary data input 164. A formulary data input 164 includes any of the formulary data input 164 as described above in more detail in reference to FIGS. 1-6. Computing device 104 analyzes the formulary data input 164 to create fragments of the formulary data input 164. Computing device 104 performs a second machine-learning process 160 utilizing the fragments of the formulary data input 164 and generates a record 156 utilizing the second machine-learning process 160. Second machine-learning process includes any of the machine-learning process 160 as described above in more detail in reference to FIGS. 1-6. Computing device 104 generates a record 156 utilizing the second machine-learning process 160. Computing device 104 transmits the generated record 156 to a plurality of outpost 168. Outpost 168 include any of the outpost 168 such as pharmacies, as described above in more detail in reference to FIG. 8. Computing device 104 receives a communication from the plurality of outpost 168 and transmits the communication from the plurality of outpost 168 to a sponsor. A sponsor includes any of the sponsors as described above in more detail in reference to FIGS. 1-6. Computing device 104 receives a decision referencing the communication from the plurality of outpost 168 from the sponsor.

With continued reference to FIG. 8, computing device 104 receives an input 112 containing a requested treatment 172. A requested treatment 172 includes any of the requested treatment 172 as described above in more detail in reference to FIGS. 1-6. In an embodiment, a requested treatment 172 may be generated by computing device 104 using machine-learning, such as when a physician may not know what medication to prescribe for a certain condition or situation. Computing device 104 retrieves an element of user data stored within computing device 104 and generates an input 112 containing a requested treatment 172 using the element of user data and a fifth machine-learning process 160. Computing device 104 retrieves from the immutable sequential data structure 148 a price quote for the requested treatment 172. In an embodiment, a price quote from one or more outpost 168 may be stored within the immutable sequential data structure 148. Computing device 104 rejects the price quote. Computing device 104 rejects a price quote when the price quote may be more money than a user is willing to spend on a treatment and/or when a treatment is not covered by a formulary and a user has to pay out of pocket for the treatment. Computing device 104 locates a treatment with an acceptable price quote using a fourth machine-learning process. A fourth machine-learning process 160 includes any machine-learning process 160 as described above in more details in reference to FIG. 1. An acceptable price quote may include a price quote that contains a dollar amount that a user is willing to pay for a treatment and/or when a treatment will be covered by an insurance company.

With continued reference to FIG. 8, computing device 104 identifies a record 156 pertaining to a user wherein the record 156 contains an unfilled prescription. An unfilled prescription includes any of the unfilled prescriptions as described above in more detail in reference to FIGS. 1-7. Computing device 104 receives an input 112 from a user rejecting the prescription and may offer a second biochemical identification such as a substitute prescription using a sixth machine-learning process 160. A user may reject a prescription such as when a user does not want to fill a particular prescription, when a user may not want to pay for a particular prescription, and/or when a user may be allergic to an ingredient contained within a prescription. Computing device 104 may receive an input 112 accepting a substitution. Computing device 104 creates a record 156 wherein the record 156 contain an indication of a prescription status filled with a substitute. In such an instance, record 156 may be insert into the immutable sequential data structure 148.

With continued reference to FIG. 8, computing device 104 identifies a record 156 wherein the record 156 contains an unfilled prescription. An unfilled prescription includes any of the unfilled prescriptions as described above in more detail in reference to FIG. 1. Computing device 104 receives an input 112 from a user wherein the input 112 contains an indication to proceed with filling the prescription. Computing device 104 creates a record 156 wherein the record 156 contains an indication of the prescription filled a substitution. In such an instance, the record 156 may be inserted to the immutable sequential data structure 148.

With continued reference to FIG. 8, at step 840 a computing device 104 performs a first machine-learning process 160 utilizing the at least a retrieved input 112.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
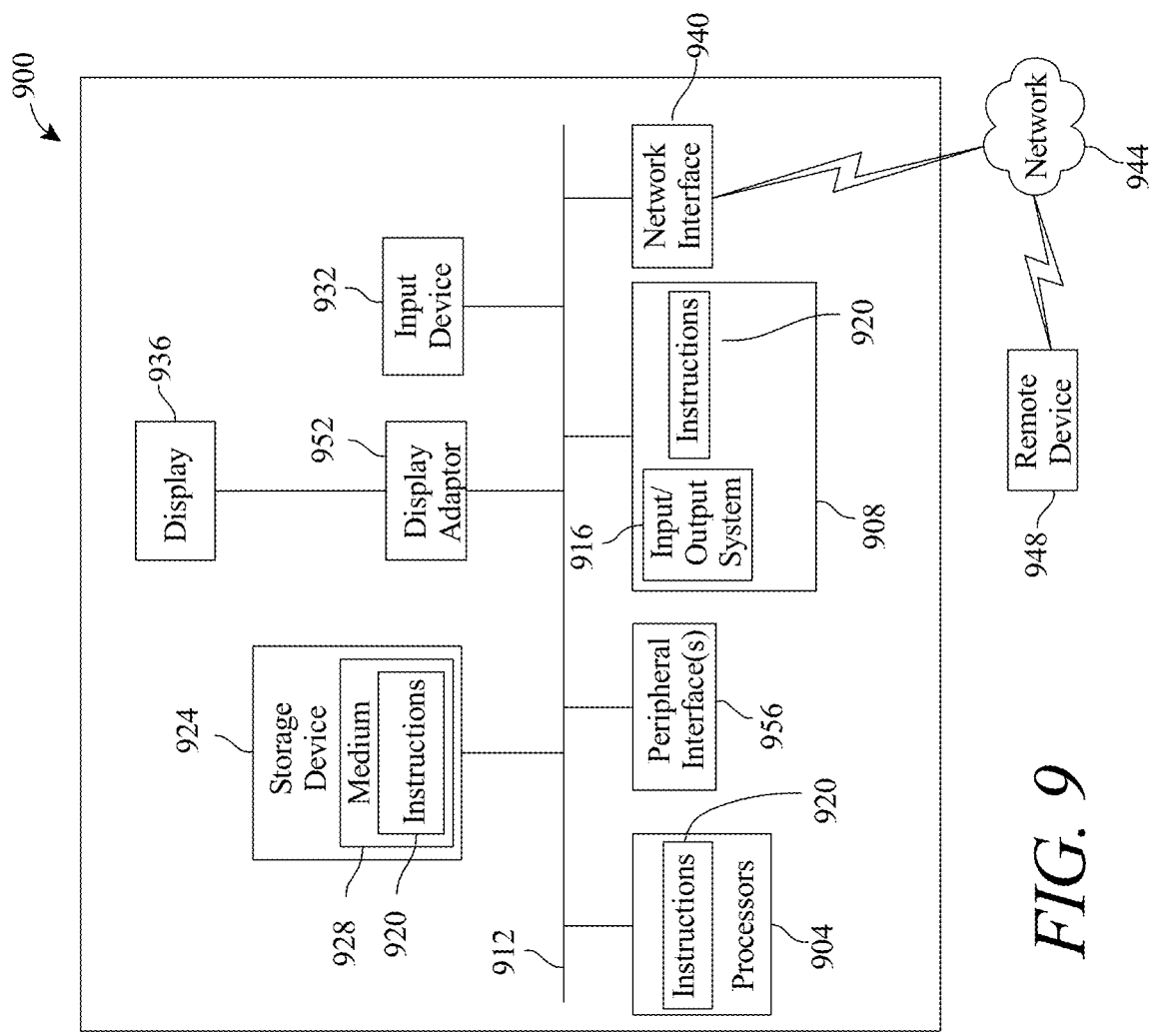
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for a synchronized distributed data structure for federated machine learning, the system including:
   a computing device, the computing device configured to:
   receive an input from a remote device;
   parse the input to identify protected and non-protected data contained within the input using a language processing module, wherein the language processing module is configured to:
   extract one or more words from the input; and
   produce mathematical associations between the one or more words extracted;
   transform the non-protected data into an encrypted proof-linked assertion;
   convert the protected data into an encrypted datastore;
   insert the encrypted proof-linked assertion into a hashed field of an immutable sequential data structure;
   retrieve the input from at least one of the immutable sequential data structure and the encrypted datastore;
   generate a record as a function of the input;
   perform a first machine-learning process as a function of the input, wherein the first machine-learning process is configured to determine typical transaction values for a set of participants using training data correlating transaction parameters to transaction values;
   calculate an incentive for each participant type in a set of participants in a given transaction as a function of the typical transaction values;
   generate a sub-listing of the record as a function of contributions received from the set of participants as a function of the calculated incentive; and
   store the sub-listing of the record in the immutable sequential data structure;
   wherein the computing device is further configured to:
   receive a parameter list data input;
   analyze the parameter list data input to create fragments of the parameter list data input, wherein the fragments include a first fragment containing information on a drug, a second fragment containing information on a date the drug was filled at a pharmacy, and a third fragment containing information on a treatment the drug was utilized for;
   perform a second machine-learning process as a function of the fragments of the parameter list data input; and generate a second record utilizing the second machine-learning process.

2. The system of claim 1, wherein the computing device is further configured to:
retrieve a first encrypted proof-linked assertion relating to a first user;
retrieve a second encrypted proof-linked assertion relating to a second user;
execute a third record between the first user and the second user as a function of the first encrypted proof-linked assertion and the second encrypted proof-linked assertion; and
post the executed third record to the immutable sequential data structure.

3. The system of claim 1, wherein the computing device is further configured to transform the non-protected data into an encrypted proof-linked assertion further comprises generating an encrypted proof using elliptic curve cryptography.

4. The system of claim 1, wherein the computing device is further configured to:
transmit the second record to a plurality of outposts;
receive a communication from the plurality of outposts;
transmit the communication from the plurality of outposts to a remote device; and
receive an assignation referencing the communication from the plurality of outposts from the remote device.

5. The system of claim 1, wherein the computing device is further configured to:
receive an input containing a requested treatment;
retrieve from an immutable sequential data structure a numerical parameter for the requested treatment; and
locate a treatment as a function of the numerical parameter using a fourth machine-learning process.

6. The system of claim 5, wherein the computing device is further configured to:
retrieve an element of user data stored within a processing module; and
generate the input containing the requested treatment using the element of user data and a fifth machine-learning process.

7. The system of claim 1, wherein the computing device is further configured to:
identify a fourth record including a first biochemical identification;
receive an input negating the first biochemical identification; and
generate a second biochemical identification using a sixth machine-learning process.

8. The system of claim 7, wherein the computing device is further configured to:
receive an authentication of the second biochemical identification; and
create a fifth record wherein the fifth record contains an indication of the second biochemical identification.

9. The system of claim 1, wherein the machine-learning process further comprises a federated machine-learning process.

10. The system of claim 1, wherein parsing the input to identify protected and non-protected data contained within the input further comprises using a language processing model configured to produce associations between a plurality of terms extracted from a corpus of documents and detect associations between such terms.

11. A method of implementing a synchronized distributed data structure for federated machine learning, the method comprising:
receiving, by a computing device, an input from a remote device;
parsing, by the computing device, the input to identify protected and non-protected data contained within the input using a language processing module, wherein using the language processing module further comprises:
extracting one or more words from the input; and
producing mathematical associations between the one or more words extracted;
generating, by the computing device, an encrypted proof-linked assertion using the non-protected data;
encrypting, by the computing device, the protected data;
inserting, by the computing device, the encrypted proof-linked assertion into a hashed field of an immutable sequential data structure;
retrieving, by the computing device, the input from at least one of the immutable sequential data structure and the encrypted data;
generating, by the computing device, a record as a function of the input;
performing, by the computing device, a first machine-learning process as a function of the input, wherein the first machine-learning process is configured to determine typical transaction values for a set of participants using training data correlating transaction parameters to transaction values;
calculating an incentive for each participant type in a set of participants in a given transaction as a function of the typical transaction values;
generating a sub-listing of the record as a function of contributions received from the set of participants as a function of the calculated incentive;
storing the sub-listing of the record in the immutable sequential data structure;
receiving, by the computing device, a parameter list data input;
analyzing, by the computing device, the parameter list data input to create fragments of the parameter list data input, wherein the fragments include a first fragment containing information on a drug, a second fragment containing information on a date the drug was filled at a pharmacy, and a third fragment containing information on a treatment the drug was utilized for;
performing, by the computing device, a second machine-learning process as a function of the fragments of the parameter list data input; and
generating, by the computing device, a second record utilizing the second machine-learning process.

12. The method of claim 11 further comprising:
executing a third record between a first user and a second user as a function of a first encrypted proof-linked assertion and a second encrypted proof-linked assertion; and
inserting the executed third record in a hashed entry of the immutable sequential data structure.

13. The method of claim 11, wherein generating the encrypted proof-linked assertion further comprises generating an encrypted proof using elliptic curve cryptography.

14. The method of claim 11 further comprising:
transmitting the second record to a plurality of outposts;
receiving a communication from the plurality of outposts;
transmitting the communication from the plurality of outposts to a remote device; and receiving an assignation referencing the communication from the plurality of outposts from the remote device.

15. The method of claim 11 further comprising:

receiving a first input;

retrieving from an immutable sequential data structure a numerical parameter for the input; and locating a second input as a function of the numerical parameter using a fourth machine-learning process.

16. The method of claim 15 further comprising:

retrieving an element of user data stored within a processing module; and generating the input containing the second input using the element of user data and a fifth machine-learning process.

17. The method of claim 11, wherein the machine-learning process further comprises a federated machine-learning process.

18. The method of claim 11, wherein parsing the input to identify protected and non-protected data contained within the input further comprises using a language processing model configured to produce associations between a plurality of terms extracted from a corpus of documents and detect associations between such terms.

* * * * *